Dec. 2, 1958 R. PLACE ET AL 2,862,253
TWO-STORY TRAILER CONSTRUCTION
Filed Sept. 15, 1950 4 Sheets-Sheet 1
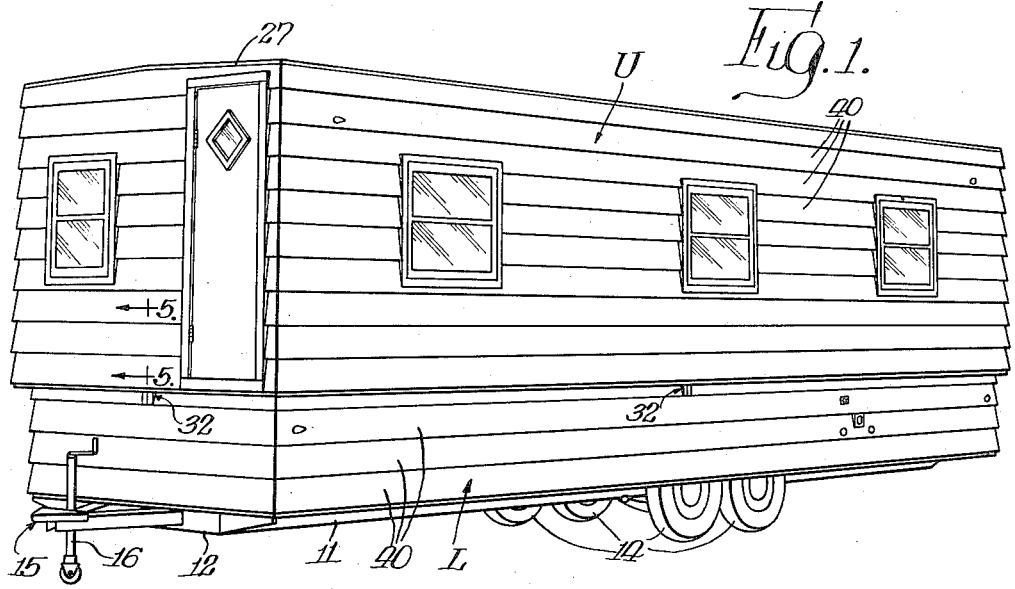
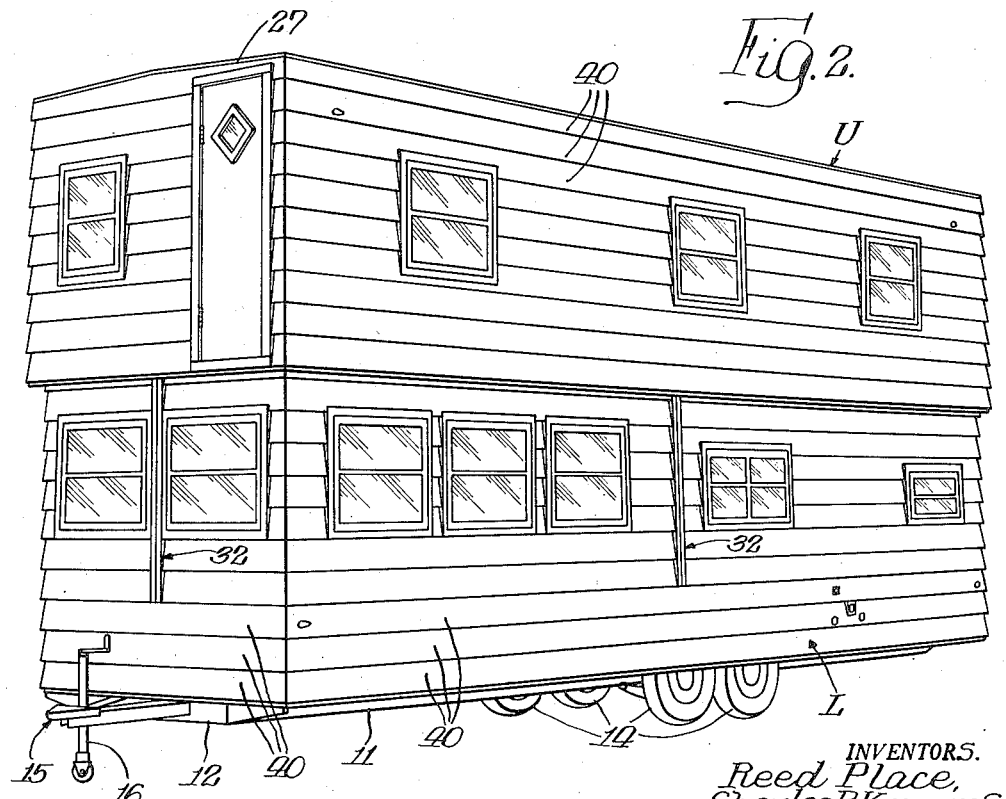
INVENTORS.
Reed Place,
BY Charles B. Kramer, Sr.,
John A. Watson
Atty.

INVENTORS.
Reed Place,
Charles B. Kramer, Sr.,
BY John A. Watson
Atty.

Dec. 2, 1958 R. PLACE ET AL 2,862,253
TWO-STORY TRAILER CONSTRUCTION
Filed Sept. 15, 1950 4 Sheets-Sheet 3
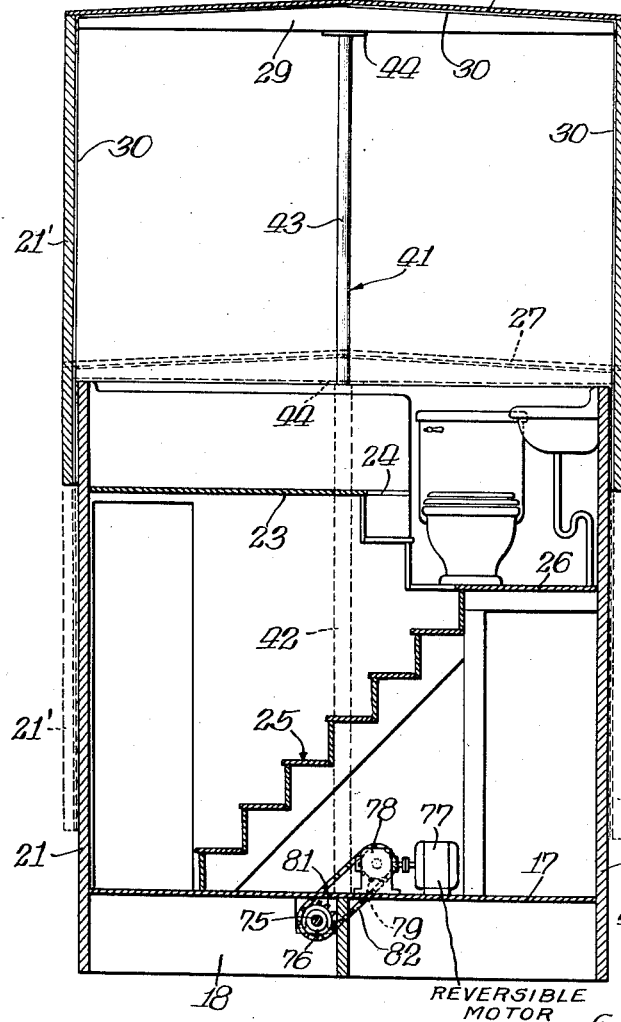
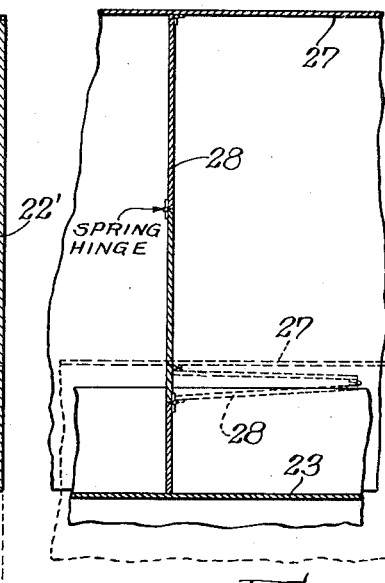
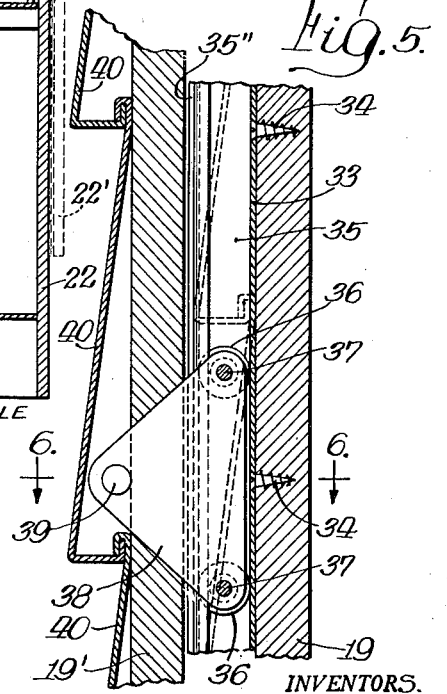
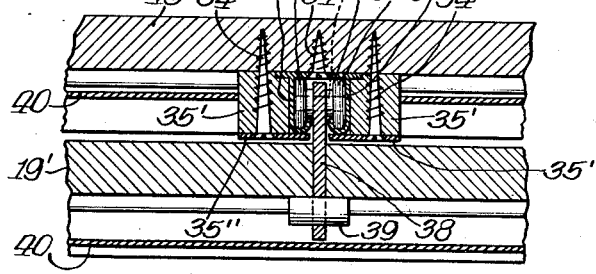
INVENTORS.
Reed Place,
BY Charles B. Kramer, Sr.
John A. Watson
Atty.

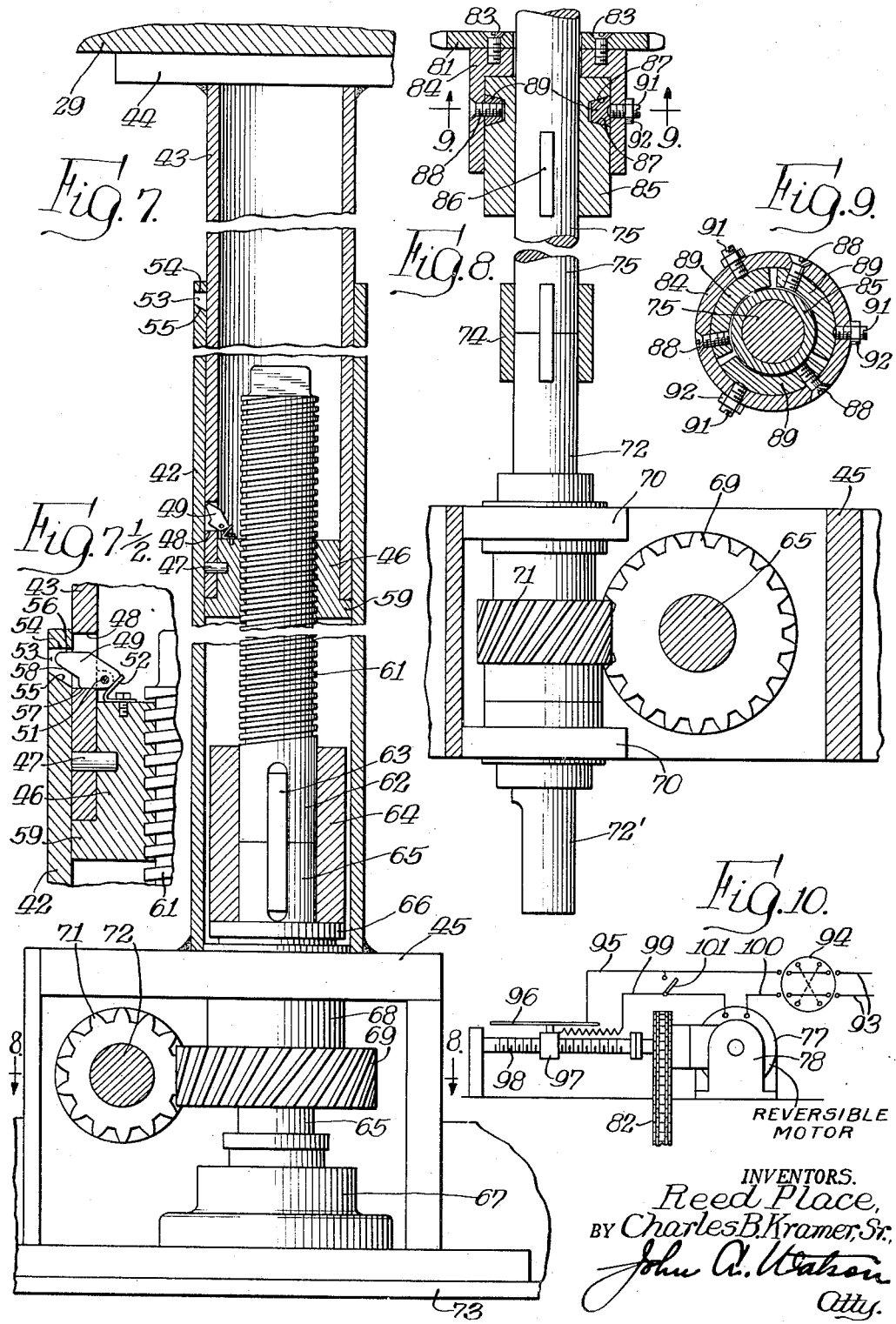

United States Patent Office 2,862,253
Patented Dec. 2, 1958

2,862,253
TWO-STORY TRAILER CONSTRUCTION

Reed Place, Syracuse, and Charles B. Kramer, Sr., Bremen, Ind., assignors to Liberty Coach Company, Inc., Bremen, Ind., a corporation of Indiana Application September 15, 1950, Serial No. 184,932

12 Claims. (Cl. 20—2)

This invention pertains to telescoping or collapsible two-story trailers, primarily those of the type known as trailer coaches which serve both as vehicles for transportation and as homes of a temporary, semi-permanent or permanent nature. More particularly, the invention is concerned with the provision of features of structural arrangements of the trailer coach body and of features of construction and operation of elevating and lowering mechanism for the upper or second-story section of such types of trailers, whereby to insure rigidity of both the upper and lower sections in all positions, including elevated positions of the upper section, and insure uniform, level and positive movement of the upper section during its movements upwardly from and downwardly to a telescoping relationship with the lower or main section and, further, to attain a maximum of safety in use under all conditions.

One of the primary objectives of the invention is to provide a simple, light and economical yet strong and rigid construction for the upper section or second-story of such trailers whereby such section will be at once rigid and strong within itself as well as with relation to the lower or main section.

Another principal objective is to provide a construction for the upper section of such nature that such section may take the thrust of mechanism for raising and lowering it, with respect to the lower section, without buckling or canting or otherwise departing from a vertical up and down path during raising or lowering movements and without injuring its structure or its contents or the contents of the lower or main section. In this connection, it is also the purpose to provide a construction such that despite the employment of a very simple and relatively inexpensive raising and lowering mechanism, including a screw-jack at each of opposite ends of the trailer sections, the load of the upper section will be well balanced and distributed both longitudinally and transversely throughout the walls and roof or ceiling of the upper section and throughout the walls, floor and framing of the lower or main section.

Still another important object is to provide an efficient, simple and relatively inexpensive mechanism by which the operations of raising and lowering the upper section may be performed by relatively inexpert or inexperienced persons, a raising and lowering mechanism of such character as to permit it to be installed without material difficulty, one which will be relatively easy to maintain as well as to operate, one which will require a minimum of space where space is at a premium, which will provide a high factor of safety and which, in cooperation with structural features generally mentioned among the above stated objects, will effectively raise and lower the upper section evenly, smoothly and uniformly without damage or danger.

Yet another important object is to provide a novel type of mechanism whereby, when the upper section has reached a pre-determined or pre-set upper or lower limit of movement, the continued application of power or effort, whether by electrical or other motive means, will be expended harmlessly and will not cause damage or injury to the trailer sections or to the several mechanisms involved.

Many other objects, as well as the advantages and uses of the invention, will be or should become apparent to those skilled in the art after reading the following description and claims and after viewing the accompanying drawings in which:

Fig. 1 is a perspective view of one type of two-story trailer in which the invention has been employed, the view illustrating the coach as it appears ready to be drawn over the road by a tractor, with the second story or upper section in telescoped or "down" position over the lower or main section.

Fig. 2 is a view corresponding to that of Fig. 1 showing the upper section in raised or elevated position as the same may appear in use as a two-story abode.

Figure 3:
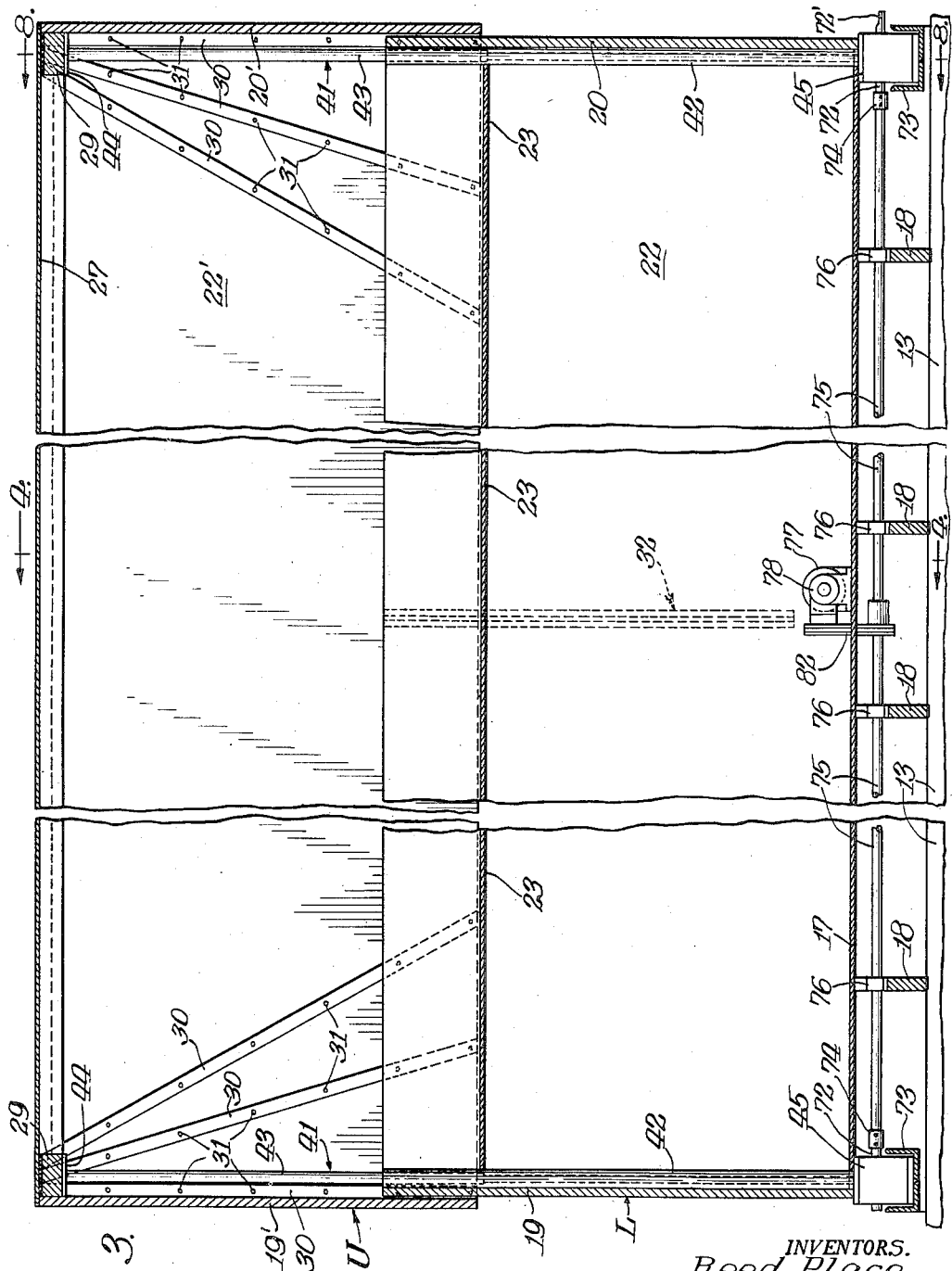

Fig. 3 is a view in longitudinal section taken in a vertical plane (relatively unimportant details of construction being omitted for the sake of simplicity) showing the manner in which the upper and lower sections are constructed and the general arrangement and disposition of the raising and lowering mechanisms, the view showing the upper section in its upper or raised position as also shown in Fig. 2.

Fig. 4 is a transverse section taken substantially on the section line 4—4 of Fig. 3, the view also illustrating a stairway for access to the upper section and certain living facilities which are not shown in other views.

Fig. 4½ is a detail view of a fragment or portion of the upper section showing a collapsible partition or the like which may be disposed transversely or longitudinally of the upper section at any convenient location for division or segregation of part of the space of the upper section, the partition also being adapted to serve as a means by which the upper limit of the upper section may be determined and further upward movement beyond such position may be stopped.

Fig. 5 is an enlarged detail view taken substantially along the section line 5—5 of Fig. 1, illustrating a portion of one of four or more suitable guide mechanisms by which the up and down movements of the upper section may be guided with respect to the lower section.

Fig. 6 is a sectional view, taken substantially along the section line 6—6 of Fig. 5.

Fig. 7 is a large scale view, partly in vertical section, of one of the screw-jack mechanisms employed to raise and lower the upper section and also showing a portion of a power transmission mechanism associated with the screw-jack mechanism.

Fig. 7½ is an enlarged fragment of the upper end of one and the lower end of the other of a pair of telescoping tubular members comprising one of the screw-jacks, illustrating details of one type of stop mechanism.

Fig. 8 is a view, partly in section, of the power transmission mechanism which includes a power transmission shaft and a friction clutch, the view being taken substantially along the section line 8—8 of Fig. 7.

Fig. 9 is a transverse sectional view of the clutch shown in Fig. 8, the view being taken substantially along the section line 9—9 of Fig. 8; and Fig. 10 is a diagrammatic illustration of one type of an electrical control system which may be employed for raising and lowering the upper section, certain of the electrical elements being symbolical.

The two-story trailer coach which in Fig. 1 is shown in collapsed condition ready for the road and which in Fig. 2 is shown as it appears when the second story is in use at some temporary or more or less permanent location of the coach, has a supporting under-framing of which some parts are indicated at 11, 12 and 13, other parts and the details of this foundation structure being omitted for simplification since, per se, they do not form any part of the present invention and are well known to those skilled in the art. Of course, under-framing of substantial structural strength is required to support the load of the trailer coach, including the lower section generally designated "L," the upper section generally designated "U" and their contents, but suitable constructions of this nature are well known and readily available as will be appreciated. The trailer coach is mounted upon running gear, including wheels 14, is provided with the usual tractor hitch generally designated 15 and may also be equipped with any usual levelling or supporting screw device designated 16.

The upper story or section "U" is arranged to telescope over the lower story or section "L" when the former is lowered to its down position as shown in Fig. 1 whereupon the coach is ready to be drawn as a trailer by any tractor means such as a truck or passenger automobile. When the trailer coach arrives at the location where it is to be used as a more or less permanent home, the upper section is raised to the position indicated in Figs. 2, 3 and 4 (full lines in the last mentioned figure). Windows and doors may be so placed in the two sections that they will register with one another when the sections are collapsed or they may be otherwise arranged, as will be understood.

The lower or main section has a floor 17 which may rest upon or be supported by transversely extending structural members 18 such as joists or sleepers, which in turn may be supported upon longitudinally extending supporting frame members 13. Rising from the floor or frame structure are end walls 19, 20, and side walls 21 and 22 of the lower or main section, these four walls providing an enclosure of a rectangular space which, as will be appreciated, may be divided up into rooms, closets, etc., to suit the convenience of occupants. The ceiling structure 23 which also may serve as a floor of the second story or upper section, is structurally connected with the end and side walls of the lower section and may receive additional support through studding or partition members or other means (not shown) extending upwardly from the lower section floor at places intermediate of the end and side walls of such section. At such location as may be convenient, the ceiling 23 is cut away to provide a stair well opening 24 through which ingress to and egress from the interior of the upper section may be had by means of a fixed stairway generally designated 25 in Fig. 4. In the illustrated embodiment, the stairway is interrupted by a landing 26 of sufficient size to permit the location of certain household utilities shown in Fig. 4.

The upper section has end walls 19', 20', and side walls 21', 22', corresponding to and overlapping, respectively, the end and side walls 19 to 22, inclusive, of the lower or main section, the upper section end and side walls being structurally secured to one another and to a roof structure 27. The roof structure 27 may be supported across and longitudinally of its area by any suitable structural elements, as will be understood, or it may require no more than certain transverse end supports to be described plus such partition members or the like, as for instance the collapsible hinged partition 28, shown in Fig. 4½, which, when in raised position, may be sufficiently strong and rigid within itself to support any reasonable load, such as snow, normally to be imposed upon it. It should be borne in mind that the ideal trailer coach should be of the lightest and most economical construction possible consistent with strength to provide a good factor of safety and to withstand the usages to which it may be put.

While under normal conditions of operation and use of a trailer coach of this character, all or substantially all of the "live" loading and practically all of the fixed or "dead" loading of the trailer will fall upon the lower or main section and little, if any, upon the upper section (the ceiling-floor 23 carrying the live and most of the dead load of occupancy of the upper section), the upper section will have considerable weight and by reason of the fact that it must move up and down from and to telescoping relation with the bottom or lower section with uniformity of rise and drop and without canting or tilting, buckling, sagging or swaying, etc., it is quite important that it be rigidly constructed and that the forces applied in raising and lowering movements be uniform and so applied as to raise the upper section evenly throughout its entire periphery. To this end, a beam 29 which may be a composite of a number of members suitably secured together, is extended transversely of the upper section between the side walls 21', 22', preferably adjacent to and against the end walls 19', 20', as illustrated in Figs. 3 and 4. These beams or structural members 29 are designated to carry the entire load imposed by the upper section itself as well as to serve as part of the integrated structure of the upper section as will be apparent.

In order to aid in stiffening the upper section and to carry some of the load of more or less remote parts of the upper section more or less directly to the beams 29, straps 30 of metal or other suitable material extend across the top of each beam 29 to the ends thereof and thence downwardly, fanwise, to the bottoms or bottom marginal portions of the side walls 21', 22', as indicated in Figs. 3 and 4. Fastening means, such as screws, bolts, or nails may secure the straps 30 at intervals indicated at 31 to the side walls and any suitable fastening means may be employed to secure the straps to the beams 29 themselves. Preferably the straps 30 are continuous across the tops of the beams and down the side walls to their respective locations but, if desired, the straps may terminate at the beam ends or on the tops of the beams at their ends rather than extend completely across the tops of the beams. This effects a very strong and rigid construction and distributes, in tension, some of the forces tending to twist or distort the upper section during raising and lowering movements as well as otherwise.

The upward and downward movements of the upper section must be guided smoothly, as will be appreciated, and to this end the main or lower section is equipped with vertical guide channels generally designated 32, one of which is disposed substantially medially of each side and end wall on the exterior thereof. The details of a channel guide of suitable character are illustrated in Figs. 5 and 6. These guide channels 32, which are made of metal, have longitudinally extending base portions 33 which may be secured as by screws 34 at suitable intervals to the respective walls 19, 20, 21 and 22, and have spaced side flanges 35, the outer ends of which are turned inwardly in spaced apart relationship to provide a grooved or tracked cage. The channel flanges 35 may be braced and retained in position by longitudinally extending wood or metal strips 35' and longitudinally extending metal face strips 35'', which together with the strips 35' may be held in place as by screws 34' located at suitable intervals along the length of the channels.

The channels provided by the in-turned flanges 35 serve as tracks and retainers for rollers 36 which are rotatably mounted upon the ends of a pin 37 disposed through and secured to a carrier plate 38, plate 38 in turn being pivotally mounted upon a pin 39 secured in any suitable manner to the adjacent wall 19', 20', or 22', as the case may be. Each plate 38 preferably is of triangular shape as shown in Fig. 5 and carries two of the pins 37 each of which is equipped with a pair of the rollers 36. The rollers 36 may have pre-lubricated and sealed bearings since once the guide mechanism has been installed, it is difficult to gain access to it for lubrication purposes. During the raising and lowering movements of the upper section, the roller and channel guides described serve their purpose of effecting smooth operation while preventing undesirable movements of the upper section transversely or longitudinally. The exterior surfaces of both the upper and lower sections of the trailer may be covered or finished in any suitable manner as for instance by sheet aluminum siding 40.

The upper section is raised and lowered by a pair of screw-jacks one of which is disposed vertically beneath the center of one of the beams 29 and the other beneath the other beam 29 at the opposite end of the trailer. These screw-jacks generally designated 41 are shown in their relative positions in Figs. 3 and 4 and in detail in Fig. 7. Each screw-jack comprises a pair of telescoping tubular members 42 and 43 the upper one of which, in this instance designated 43, is disposed within the lower one and has a sliding fit therein, thereby to effect stability during vertical up and down movements of the upper section. Welded or otherwise firmly secured to the upper end of tubular member 43 is a metal plate 44 which engages and is secured to and beneath the center portion of one of beams 29 while the bottom end of the lower tubular member 42 is firmly secured as by welding to the top of a casing 45 containing bearings and gearing to be described.

The lower end of the upper tubular member is equipped with a threaded nut 46 held firmly in position in any suitable manner as by a pin 47. Immediately above the nut 46 the tubular member 43 may be slotted as indicated at 48 for the reception of a dog 49 pivoted upon a pin 51 suitably fastened in the walls of the member 43. Secured to the inner or upper face of the nut 46, is a leaf spring or the like 52 which constantly urges the dog 49 counter-clockwise (viewing Figs. 7 and 7½) about pivot pin 51. Adjacent to the upper end of the tubular member 42 is a slot 53, the upper wall of which is normal to the axis of the tubular member, and the lower wall 55 of which is tapered inwardly and downwardly. When the upper section is at its upper limit of movement, the slots 48 and 53 will assume the relative positions of register indicated in Fig. 7½ at which time the dog 49 will have been swung about its pivot under the influence of spring 52 and caused to enter slot 53. If the upward movement of the upper section has not ceased at the limit for which mechanism to be described has been set, i. e., at some predetermined elevation, a face 56 on the dog will engage the upper wall 54 of the slot 53, and stop the upward movement of the tubular member 43 and the upper section, the dog having a portion 57 engaged with the lower wall of slot 48 at this time. Upon downward movement of the upper section the inclined wall 55 of the slot 53 will wedge or cam against an inclined face 58 of the dog thereby to swing it in a clockwise direction about its pivot 51, the outer end of the dog thereafter riding down on the inside face or surface of the lower tubular member 42.

Each nut 46 has a circumferential flange 59, the outer circumference of which may have a sliding fit within the bore of the lower tubular member 42 and circumferentially underlies and abuts against the lower end of the tubular member 43 for thrust purposes. The bore of the nut 46 is provided with threads to mate with the thread of a screw 61, the lower portion 62 of which is keyed as by a key 63 to a rotatable thrust collar 64 which is also keyed by the same key 63 to a stub shaft 65. A stationary member 66 secured to the housing 45 may serve as a thrust bearing for the collar 64 and may also serve as a radial bearing for the stub shaft 65 which passes therethrough and at its lower end is mounted in a radial bearing 67, the casing or housing for which is secured within the housing 45.

Keyed or otherwise secured to the stub shaft 65 and disposed between the bearing 67 and a stationary or rotatable spacer 68 surrounding the shaft 65, is a spiral gear 69 which is driven by a worm or helix gear 71 mounted upon a shaft 72 which extends through the housing 45 and suitable bearings 70 mounted in the housing walls. Each housing 45 is supported by a substantial box pedestal or the like 73, in turn supported by and secured to the under-framing of the trailer in any suitable manner, the mounting being such as to carry the load of the upper section to the foundation or under-framing distributing the load thereover at the front and rear areas of such framing. It will now be apparent that as the screws 61 are rotated simultaneously in one direction or the other, the reaction between the screws and their respective nuts 46 will either raise or lower the upper section.

The shafts 72 are connected through flexible couplings or universal joints 74 with a transmission or line shaft 75 which passes through the joists or sleepers 18 and bearings 76 mounted therein. The shaft 75 is a single shaft, that is, if it is composed of separate pieces of shafting those pieces are firmly coupled together to rotate as one, which may be rotated either by hand through cranks attached to the exteriorly projecting ends 72' or by an electric motor, or the like, 77, through suitable transmission mechanism to be described.

The motor 77, which for convenience may be disposed in the space or recess beneath the stairs 25, may drive a set of reduction gears disposed within the casing 78 and such reduction gearing may drive a sprocket 79 in turn driving a sprocket 81 through a chain 82. Sprocket 81, as shown in Fig. 8, is mounted on the shaft 75 for rotation therewith and relative thereto but is secured as by screws 83, to a counter-bored sleeve 84, also mounted on the shaft 75 for rotation therewith and relative thereto. Disposed within the counter-bore of the sleeve 84 is a collar 85 which is secured to the shaft 75, against longitudinal and rotary movement relative thereto, by a key or the like 86. Collar 85, which may be of steel or the like, at a place within the counter-bore of sleeve 84, is provided with a circumferentially extending groove the side walls 87 of which are tapered at an angle within a range of from 15 degrees to 25 degrees, both inclusive, to a diametral plane normal to the axis of shaft 75. Preferably the side walls 87 of this groove are tapered at an angle of 20 degrees, i. e., the mean of the range given. The bottom of the groove may be flat or concave or such other shape as will not interfere with functioning to be described.

Secured as by screws 88 to the inside surface of the counter-bore of sleeve 84 are a plurality (in this instance three) of arcuately shaped and segmental elements 89, preferably made of bronze. Each element 89 has tapered side walls corresponding closely in taper and transverse dimensions to the taper and transverse dimensions of the side walls of the groove in the collar 85. It will also be noted that each element 89 is secured to the sleeve 84 by its screw 88 at a place adjacent to one of its ends, each element being secured by a corresponding end. Adjacent to its opposite end each of these elements 89 is arranged to be engaged by the inner end of a set screw 91 which is threadedly engaged with the wall of the sleeve 84 and which, at its outer end, may be equipped with a lock nut 92. The sleeve 84, grooved collar 85, and the bronze elements 89 constitute a friction clutch. The degree of frictional interengagement effective between the sleeve 84 and the collar 85 through the pressure between the sides of elements 89 and the sides 87 of the groove, may be varied over a substantial range by tightening or loosening the set screws 91.

Motor 77 preferably is of the reversible type so that power may be supplied to the shaft 75 to rotate it in either direction and thence through the various transmission elements to the jack-screws 61 thereby to raise or to lower the upper section of the trailer. Fig. 10 diagrammatically and symbolically illustrates one type of electrical control system which may be employed with a direct current motor but other adequate systems for alternating as well as direct current are well known. Since there must be a limit to each of the upward and downward movements of the upper section relative to the main or lower section of the trailer, and since an unskilled operator might fail to turn off the motor at the proper time, it is desirable to employ some automatic device such as a limit switch to cut off the current to the motor at such time as the upper section has reached pre-determined upward and downward positions. In Fig. 10 conductors from any suitable source of direct current lead to a manually operable reversing switch 94 conveniently mounted within the lower section of the trailer. One line 95 leads from the switch to a contact strip 96 of a limit switch for engagement by a traveling contact 97 carried by and movable from end to end of a feed screw 98 which may be driven at a speed proportional to the speed of travel of the screw-jacks through a connection with the gearing in the casing 78. A lead 99 connects the traveling contact 97 with one side of the motor while a lead 100 runs from the other side of the motor to the other contact of the reversing switch. When the switch 94 is in the position shown with the full lines thereacross making connection between the incoming leads 93 and the motor leads 95 and 100, the motor will run in one direction and through the transmission will drive the two jackscrews in one direction until the limit switch contacts disconnect. When the switch 94 is rotated ninety degrees, the crossed leads shown in the dotted lines on the switch 94 will connect the motor and line leads in such manner as to reverse current and the motor. In this illustration it is assumed that direct current is applied and that the operator momentarily will close a short circuiting switch 101 after operating the reversing switch thereby to initiate movement of the traveling contact 97 in the reverse direction to that in which it previously had been moved. Where alternating current is employed the reversal of the motor is effected by other means as will be understood.

Should the limit switch fail to cut out or stop the motor and the upper section on upward movement has reached one upper predetermined limit, the safety dogs 49 will drop into the slots 53 and prevent further upward movement of the section whereupon further effort of the motor will be wasted but damage to the various mechanisms involved will be avoided or prevented by slippage of the friction clutch shown in Figs. 8 and 9. As will be appreciated, it may be unnecessary to employ the dogs 49 and their associated mechanism as positive stops since one or more of the collapsible hinged partitions 28 may serve the same purpose, i. e., to stop the upward movement of the upper section. A positive stop for the downward movement of the upper section may be provided by engagement of the beams 29 or plates 44 with the top edges of the end walls of the lower section. If desired, a thermostatically operated safety switch (not shown) may be employed to open the motor circuit upon a predetermined rise in temperature of the friction clutch caused by the friction of slippage thereof. The short circuiting switch 101 may also be used to cut out the limit switch and operate the motor directly should occasion demand.

While we have illustrated and described a preferred form of the invention, various modifications and changes may be made therein as will be apparent to those skilled in the art. Consequently we do not desire to be limited except by the invention spirit and the scope of the appended claims.

We claim:

1. In a two-story trailer having a relatively rigid main body section having a floor structure and substantially opposite pairs of vertical side and end walls thereabout, a relatively rigid upper section telescopically associated with the main body section and including substantially vertical side and end walls corresponding to the said walls of said main section and a roof structure, and mechanical means reacting between said main and upper sections adjacent to correspondingly opposite vertical walls of each for raising and lowering the upper section with respect to the main section in said telescopically associated relationship, a beam member extending between one of the said substantially opposite pairs of walls of said upper section above the bottom thereof and between said mechanical means and upper section and structurally connected to and carried by said upper section for movements therewith and a plurality of load distributing tension members connected to said beam and extending to and secured to the said side walls at spaced places along bottom portions thereof below said beam and intermediate of the said opposite end walls.

2. In a two-story trailer having a relatively rigid main body section having a floor structure and substantially opposite pairs of vertical side and end walls thereabout, a relatively rigid upper section telescopically associated with the main body section and including substantially vertical side and end walls corresponding to the said walls of said main section and a roof structure, and mechanical means reacting between said main and upper sections adjacent to correspondingly opposite vertical walls of each for raising and lowering the upper section with respect to the main section in said telescopically associated relationship, a beam member extending between one pair of the said substantially opposite pairs of walls of said upper section above the bottom thereof and between said mechanical means and upper section and structurally connected to and carried by said upper section for movement therewith, and a plurality of load distributing tension members connected to said beam and extending fan-wise downwardly from each end of the beam to and secured to the said adjacent wall at such end of the beam at spaced places along bottom portions of such wall below said beam.

3. In a trailer of the type described having a relatively rigid main body section including opposite end walls and opposite side walls and a floor structure, and a relatively rigid upper section telescopically associated with said main section and including a roof structure and opposite end and side walls corresponding to the end and side walls of said main section, a beam in the upper portion of said upper section adjacent to each end thereof, each of the beams being extended between the side walls of the upper section and structurally secured with respect to the upper section end walls and roof, and a plurality of structural tension members secured to each beam adjacent to each of its end portions thereof and extending downward across and secured to the respectively adjacent side wall of the upper section at spaced places intermediate of the end walls of the upper section.

4. In a trailer of the type described having a relatively rigid main body section including opposite end walls and opposite side walls and a floor structure, and a relatively rigid upper section telescopically associated with said main section and including a roof structure and opposite end and side walls corresponding to the end and side walls of said main section, a beam in the upper portion of said upper section adjacent to each end thereof, each of the beams being extended between the side walls of the upper section and structurally secured with respect to the upper section end walls and roof, and a plurality of structural tension members secured to each beam and extending fan-wise from adjacent to each beam end over and secured to the respectively adjacent side wall of the upper section at spaced places intermediate of the end walls of the upper section.

5. In a trailer of the type described having a relatively rigid main body section including opposite end walls and opposite side walls and a floor structure, and a relatively rigid upper section telescopically associated with said main section and including a roof structure and opposite end and side walls corresponding to the end and side walls of said main section, a beam in the upper portion of said upper section adjacent to each end thereof, each of the beams being extended between the side walls of the upper section and structurally secured with respect to the upper section end walls and roof, a plurality of structural tension members secured to each beam and extending fanwise from adjacent to each beam end downwardly across and secured to the respectively adjacent side wall of the upper section at spaced places intermediate of the end walls of the upper section, and means reacting between each beam and the main body section for raising and lowering the upper section relative to the main section.

6. In a trailer of the type described having a relatively rigid main body section including opposite end walls and opposite side walls and a floor structure, and a relatively rigid upper section telescopically associated with said main section and including a roof structure and opposite end and side walls corresponding to the end and side walls of said main section, a beam in the upper portion of said upper section adjacent to each end thereof, each of the beams being extended between the side walls of the upper section and structurally secured with respect to the upper section end walls and roof, a plurality of structural tension members secured to each of the end portions of each beam and extending downwardly therefrom and secured to lower portions of the adjacent side wall of the upper section at spaced places intermediate of the end walls of the upper section, and jack means reacting between each beam and the main section for raising and lowering the upper section relative to the lower section.

7. In a two-story trailer including upper and lower sections arranged to telescope, one section within the other, the upper section being movable to an upwardly extended position with respect to the lower section, a pair of transverse beams extending in spaced and relatively parallel relation to one another between opposite walls of the upper section, a pair of screw jacks, there being a single screw-jack reacting between each said beam and the lower section at a place between the beam ends for raising and lowering the upper section, means including a single power transmission shaft connecting said screw-jacks for operating the jacks in unison to raise or lower said upper section, means for limiting the upward and downward movements of said upper section, a motor for supplying power to said transmission shaft, and means including a friction clutch connecting said motor and shaft.

8. In a two-story trailer having a relatively fixed lower section including opposite end walls, side walls and a floor and an upper section telescopically associated with the lower section and movable relative thereto between predetermined upper and lower limits, said upper section including opposite end walls and side walls corresponding to the end and side walls, respectively, of the lower section and a roof, a pair of beams extending in spaced relation to one another between the side walls of the upper section and adjacent to the roof thereof, tension means connecting each of said beams and lower parts of said upper section, a pair of screw-jacks arranged for reaction between said beams and the lower section whereby to raise and lower said upper section, one of said jacks being disposed adjacent to the corresponding adjacent end walls of the sections at one end of the trailer and the other jack being similarly disposed with relation to the opposite end walls at the other end of the trailer, a power transmission shaft having positive driving connection with both screw-jacks at all times, a motor for driving said shaft, and friction clutch mechanism between said motor and shaft.

9. In a two-story trailer including upper and lower sections arranged to telescope, one section within the other, the upper section being movable in opposite directions between a predetermined upwardly extended position and a predetermined lower position with respect to the lower section and having screw-jack means reacting between the upper and lower sections for raising and lowering said upper section with respect to the lower section, an electric motor, transmission means including a friction clutch between said motor and screw-jack for operating said jack, and means for varying the frictional effect of said clutch.

10. In a two-story trailer including upper and lower sections arranged to telescope, one section within the other, the upper section being movable in opposite directions between a predetermined upwardly extended position and a predetermined lowered position with respect to the lower section and having screw-jack means reacting between the upper and lower sections for raising and lowering said upper section with respect to the lower section, an electric motor, transmission means including a friction clutch between said motor and screw-jack for operating said jack, and limit switch means normally functional to stop said motor when said upper section has reached either of said predetermined positions.

11. In a two-story trailer including upper and lower sections arranged to telescope, one section within the other, the upper section being movable in opposite directions between a predetermined upwardly extended position and a predtermined lowered position with respect to the lower section and having screw-jack means reacting between the upper and lower sections for raising and lowering said upper section with respect to the lower section, power applying means including a power transmission shaft for driving said screw-jack to move said upper section to one of said predetermined positions, and means operative upon the attainment by the upper section of said one of said predetermined positions for limiting the effective force thereafter reacting between said sections through said jack upon the continued application of power through said power applying means.

12. In a two-story trailer including upper and lower sections arranged to telescope, one section within the other, the upper section being movable in opposite directions between a predetermined upwardly extended position and a predetermined lowered position with respect to the lower section and having screw-jack means reacting between the upper and lower sections for raising and lowering said upper section with respect to the lower section, power applying means including a power transmission shaft for driving said screw-jack to move said upper section to either of said predetermined positions, and means operative upon the attainment by the upper sections of either of said predetermined positions for limiting the effective force thereafter reacting between said sections through said jack upon the continued application of power through said power applying means.

References Cited in the file of this patent

UNITED STATES PATENTS

| Number | Name | Date |
|---|---|---|
| 283,218 | De Rycke | Aug. 14, 1883 |
| 335,432 | Dalzell | Feb. 2, 1886 |
| 1,112,003 | Green | Sept. 29, 1914 |
| 1,490,951 | Werner | Apr. 22, 1924 |
| 1,554,755 | Parsons | Sept. 22, 1925 |
| 1,964,894 | Rohne | July 3, 1934 |
| 1,985,732 | Jauch et al. | Dec. 25, 1934 |
| 2,105,293 | Paulin | Jan. 11, 1938 |
| 2,155,876 | Stout | Apr. 25, 1939 |
| 2,160,315 | Prince | May 30, 1939 |
| 2,193,352 | Thomas | Mar. 12, 1940 |
| 2,252,166 | Clawson et al. | Aug. 12, 1941 |
| 2,323,106 | Whiteman | June 29, 1943 |
| 2,366,739 | McCoy | Jan. 9, 1945 |
| 2,608,381 | Pelough | Aug. 26, 1952 |
| 2,636,424 | Lebert | Apr. 28, 1953 |